No. 794,232. PATENTED JULY 11, 1905.
T. H. KINGSCOTE & W. WILLIAMS.
AUTOMATIC ADVERTISING MACHINE.
APPLICATION FILED DEC. 21, 1903.
2 SHEETS—SHEET 1.
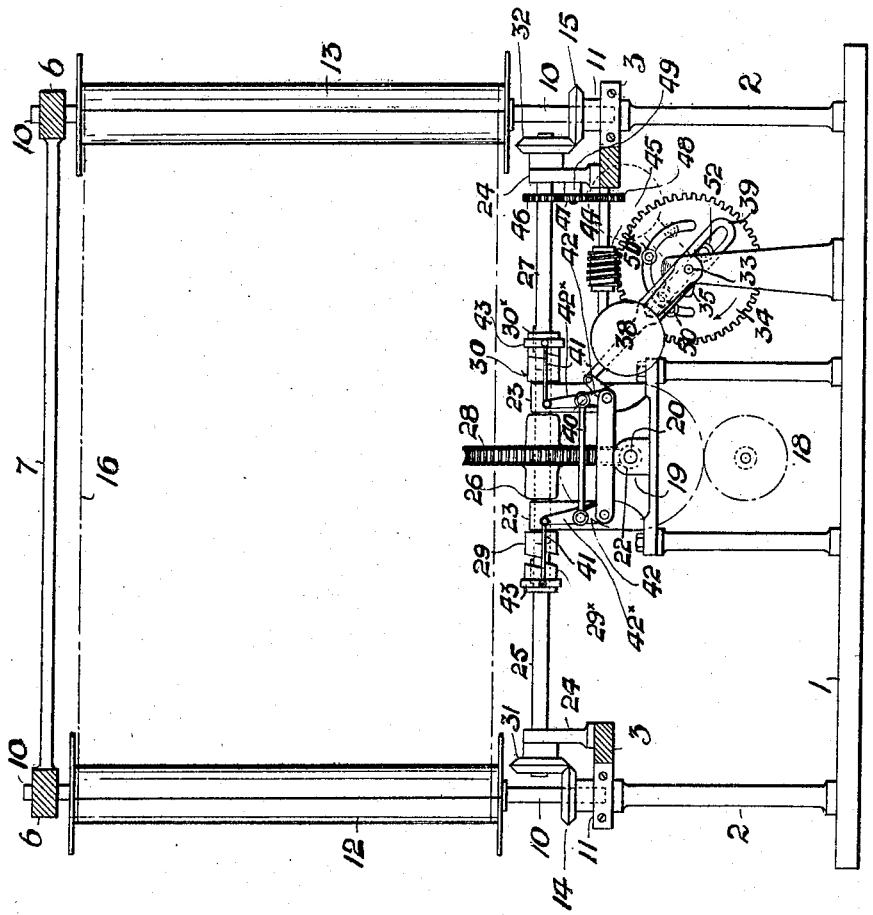
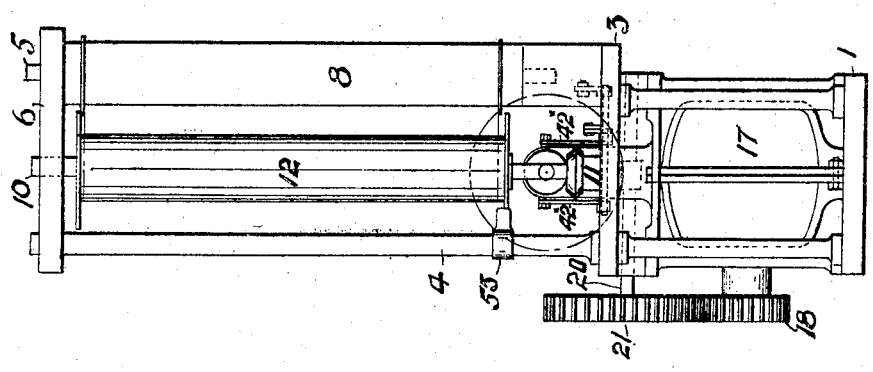
WITNESSES:
John Lamb
Pickles D. Bailey
Inventors
Thomas H. Kingscote
William Williams
By their Attorney Walter Gunn No. 794,232. PATENTED JULY 11, 1905.
T. H. KINGSCOTE & W. WILLIAMS.
AUTOMATIC ADVERTISING MACHINE.
APPLICATION FILED DEC. 21, 1903.
2 SHEETS—SHEET 2.
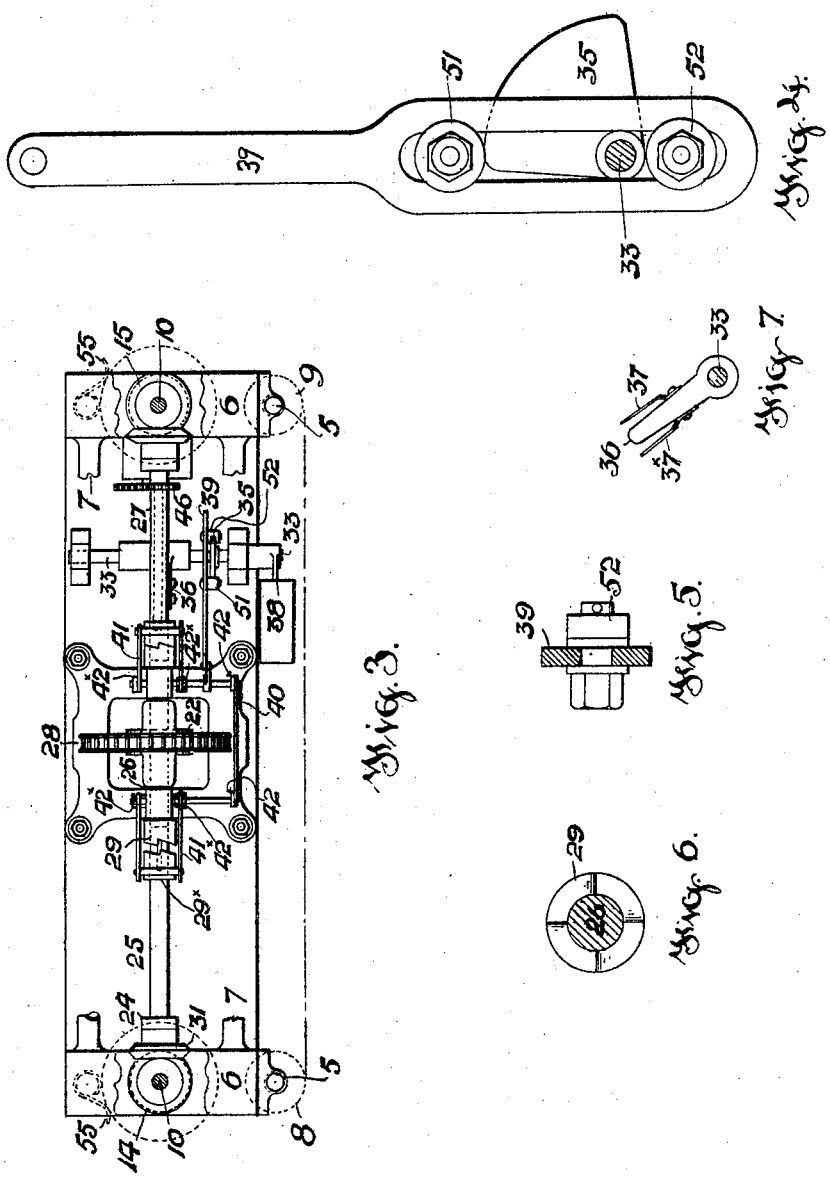
Witnesses
John Camp
Pickles D. Bailey
Inventors:
Thomas H. Kingscote
William Williams
By their Attorneys: Walter Gunn No. 794,232.

Patented July 11, 1905.

UNITED STATES PATENT OFFICE.

THOMAS HENRY KINGSCOTE AND WILLIAM WILLIAMS, OF ECCLES, NEAR MANCHESTER, ENGLAND.

AUTOMATIC ADVERTISING-MACHINE.

SPECIFICATION forming part of Letters Patent No. 794,232, dated July 11, 1905.

Application filed December 21, 1903. Serial No. 186,136.

*To all whom it may concern:*

Be it known that we, THOMAS HENRY KINGSCOTE and WILLIAM WILLIAMS, subjects of the King of Great Britain and Ireland, and residents of Eccles, near Manchester, England, have invented a certain new or Improved Automatic Advertising-Machine, of which the following is a specification.

This invention relates to and consists of improvements in apparatus for exhibiting or displaying pictures, advertisements, and like matter one after another and after the series has been displayed automatically reversing the direction of movement and displaying the pictures, advertisements, &c., in the reverse order.

Upon the accompanying drawings, Figure 1 illustrates a front elevation, Fig. 2 an end elevation, and Fig. 3 a plan, of a machine embodying the invention. Figs. 4, 5, 6, and 7 illustrate details.

1 is a base-plate whereon is supported a series of posts or uprights 2 and plates 3. Upon such plates are further posts or rods 4 5, joined at their upper extremity by bars 6 and cross-rails 7. Upon the rods 5 are loosely mounted guide-rollers 8 9. Between the plates 3 and each of the bars 6 is a vertical rod or spindle 10, loosely projecting through the bar 6 at its upper end and taking into a footstep-bearing 11 at its lower end. Upon one spindle and keyed thereon is a flanged roll or drum 12, and upon and keyed to the other spindle is a similar roll or drum 13. Also upon one spindle is keyed a bevel gear-wheel 14 and upon the other a like wheel 15.

To the rolls 12 13 the respective ends of a long apron or band of translucent material 16 are secured, and the band, which in width is almost the full length of the rolls between their flanges, is wrapped around one or the other or partly around one and partly around the other. Upon this band the advertisements or other matters are printed, and each occupies a space slightly less than the distance between the rolls 12 13.

Upon the base-plate 1 and within a suitable casing 17 is an electric motor. Upon the motor-shaft is a toothed pinion 18, and in bearings 19, carried by the motor-casing, is shaft 20, with toothed wheel 21, which gears with the said pinion. (See Fig. 2.) Upon the shaft 20 is also a worm 22.

Extending across the machine and supported in bearings 24 on the plates 3 and in bearings 23 on the top of the motor are three short shafts 25 26 27, arranged end to end and in line with each other. Fixed to the shaft 26 is a worm-wheel 28 and the two half parts 29 30 of two clutches. Upon the shafts 25 27, respectively, are slidably keyed the half-clutches $29^\times$ $30^\times$, when desired adapted to engage the half-clutches 29 30, in which latter the shaft ends meet and take their support, as shown more clearly in Fig. 3. Also keyed upon the shafts 25 27 are bevel-wheels 31 32, which mesh, respectively, with the wheels 14 and 15. As shown, the half-clutch $29^\times$ is designed only to engage the half-clutch 29 when the half-clutches 30 $30^\times$ are disengaged, and vice versa, so that in rotating the shaft 25 and the band 16 in one direction the shaft 27 runs idly in the reverse direction under the pull of the band.

The means for bringing about the automatic clutching and unclutching of the shafts 25 and 26 and 26 and 27 after each time the band has passed from one roll to another consist of a shaft 33, a worm-wheel 34, loosely mounted on such shaft, a cam 35, a lever-arm 36, fitted with spring-blades 37 $37^\times$, (see Fig. 7,) and a weighted lever 38, also of a slotted hanger 39 and an arrangement of links 40 41, levers 42 $42^\times$, and yokes 43, connecting such hanger with the half-clutches $29^\times$ and $30^\times$. The said means also consist of a shaft 44 with worm 45, gearing with the worm-wheel 34, and a train of gear-wheels 46 47 48, the latter being mounted on the shaft 44, while the wheel 47 is mounted on a stud 49.

In the wheel 34 is a slot, and in such slot are two adjustable studs 50 $50^\times$, against one or the other of which the lever-arm 36 is designed to rest according to the position of the weighted lever 38. In the slot of the hanger are two adjustable stops 51 52, which lie at a distance apart equal to the length of the cam. The hanger embraces the shaft 33, and the cam lies between the stops 51 52.

It will now be seen that with the shaft 26 clutched to the shaft 27, as shown, the band 16 will be rolled off roll 12 onto the roll 13, the shaft 25 merely rotating idly by the unrolling of the band. Due to the motion thus imparted to the shaft 27, the worm 45, worm-wheel 34, and shaft 33 are rotated, thereby causing the studs 50 on the wheel 34 to gradually raise the lever-arm 36, and with it the weighted lever 38, until the lever-arm 36 is substantially vertical, when the spring-blade 37, previously compressed, extends and tilts the weighted lever over its center, which lever then quickly falls down on the other side of its axis until the lever-arm 36 meets the other stud $50^×$ on the wheel 34, as shown by dotted lines in Fig. 1. Due to such falling of the weight the cam 35 is simultaneously caused to push against the lower stop 52 and move the hanger downward, thereby pulling over the lever 42 and through the links 40, levers $42^×$, links 41, and yokes 43 unclutching the shafts 26 and 27 and clutching shafts 25 and 26. The motion of the band 16 is then reversed, and the shaft 27 then rotates idly in the reverse direction due to the unrolling of the band off roll 13 onto roll 12. With such reverse rotation the wheel 34 gradually raises the lever-arm 36 and weighted lever 38 until the latter again reaches or almost reaches the vertical, when the spring $37^×$ on lever-arm 36, previously compressed, expands and tilts the lever 38 back again over its center, when such lever falls forward until it meets the stud 50. Such movement simultaneously reverses the cam 35, which moves the hanger upward, and through the links, levers, and yokes aforesaid unclutches shafts 25 and 26 and reclutches shafts 26 and 27, when the motion of the band 16 is again reversed, and so on continuously.

In Fig. 4 we show the hanger to a larger scale and in Fig. 5 we show a cross-section on line $a\ b$, which view also illustrates how the stops 51 52 are fixed.

There are by preference four or more clutch-teeth in the clutches, so that there shall be as little loss of movement as possible. (See Fig. 6.)

For steadying the action of the band and preventing recoil of the rollers small brakes 55 may be applied.

What we claim is—

In devices for exhibiting pictures, advertisements and like matter and automatically changing the same a pair of rollers shafts therefor, a band secured at each end to the said rollers and adapted to roll off one onto the other, three short shafts end to end, a worm-wheel on the central shaft, a half-clutch fixed on each end of the central shaft and half-clutches on the ends of the other shafts capable of being slid into and out of engagement with those on the central shaft and of rotating the other shafts alternately, bevel-wheels on the two end shafts, and bevel-wheels on the said roller-shafts, a worm-wheel with segmental slot and an axis for said wheel, studs adjustably fitted in the slot of the said worm-wheel, a worm and worm-shaft, and gear-wheels for rotating the said worm-wheel from the motion of said end-to-end shafts, a lever-arm on the worm-wheel axis with spring-blades on its opposite edges and normally resting upon one or the other of the said studs, a weighted lever and a cam also on the worm-wheel axis, a slotted hanger-plate embracing said axis and stops adjustably fitted to the said hanger and between which the said cam lies, and means intermediate of the said hanger-plate and the clutches aforesaid whereby when the hanger-plate is moved up or down the said clutches are moved endwise, as set forth.

In witness whereof we have hereunto set our hands in the presence of two witnesses.

THOMAS HENRY KINGSCOTE.
WILLIAM WILLIAMS.

Witnesses:
WALTER GUNN,
JOHN CAMP.